(12) United States Patent
Chen et al.

(10) Patent No.: US 8,218,097 B2
(45) Date of Patent: Jul. 10, 2012

(54) LIQUID CRYSTAL DISPLAY

(75) Inventors: Po-Yang Chen, Tao-Yuan Hsien (TW);
Po-Sheng Shih, Tao-Yuan Hsien (TW);
Hsuan-Lin Pan, Tao-Yuan Hsien (TW);
Jiunn-Shyong Lin, Tao-Yuan Hsien (TW)

(73) Assignee: HannStar Display Corporation,
Tao-Yuan Hsien (TW)

( * ) Notice: Subject to any disclaimer, the term of this patent is extended or adjusted under 35 U.S.C. 154(b) by 896 days.

(21) Appl. No.: 12/100,229

(22) Filed: Apr. 9, 2008

(65) Prior Publication Data

US 2009/0128724 A1   May 21, 2009

(30) Foreign Application Priority Data

Nov. 21, 2007   (TW) .............................. 96144122 A

(51) Int. Cl.
*G02F 1/1343* (2006.01)
(52) U.S. Cl. .......................................... 349/38
(58) Field of Classification Search ...................... 349/38
See application file for complete search history.

(56) References Cited

U.S. PATENT DOCUMENTS

| 4,782,350 | A | 11/1988 | Smith et al. |
| 5,173,835 | A | 12/1992 | Cornett et al. |
| 6,392,623 | B1 * | 5/2002 | Shimada ......................... 345/92 |

FOREIGN PATENT DOCUMENTS

| TW | 527574 | 4/2003 |
| TW | 200728881 | 8/2007 |

* cited by examiner

*Primary Examiner* — Phu Vu
(74) *Attorney, Agent, or Firm* — Muncy, Geissler, Olds & Lowe, PLLC

(57) ABSTRACT

The present invention provides a liquid crystal display with a plurality of pixel units. Each pixel unit includes two sub-pixels, and each sub-pixel includes a thin film transistor, a liquid crystal capacitor and a storage capacitor. One of the storage capacitors is a tunable capacitor. The tunable capacitor includes a first conductive layer, an insulating layer, a semiconductor layer with a area $A_{sem}$, and a second metal layer. The second conductive layer has a first region with a area $A_{con}$ overlapping with the semiconductor layer. The area $A_{con}$ is less than the area $A_{sem}$.

11 Claims, 5 Drawing Sheets

$d_2 \leq 20 \mu m$

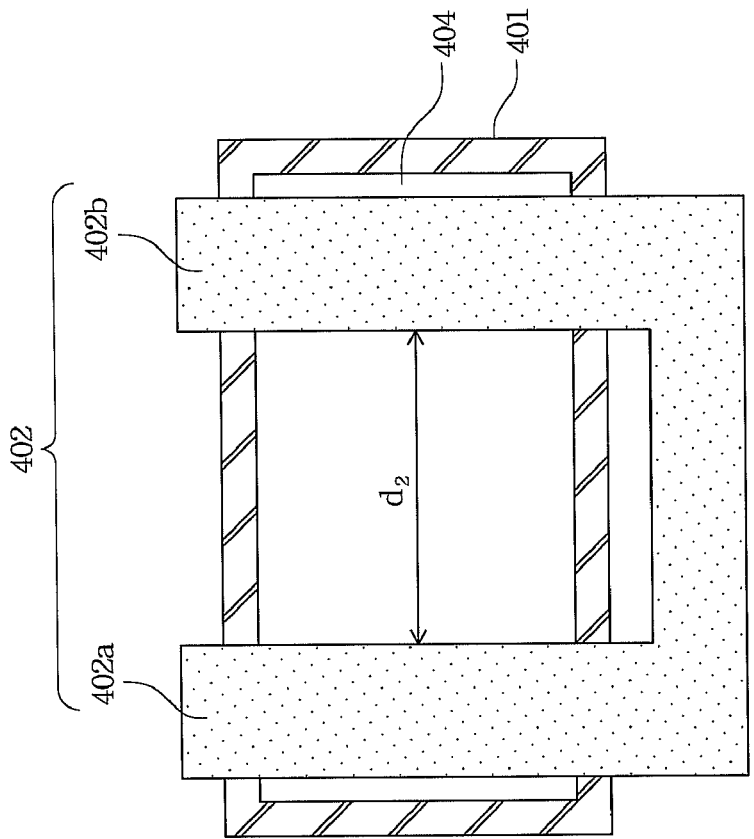
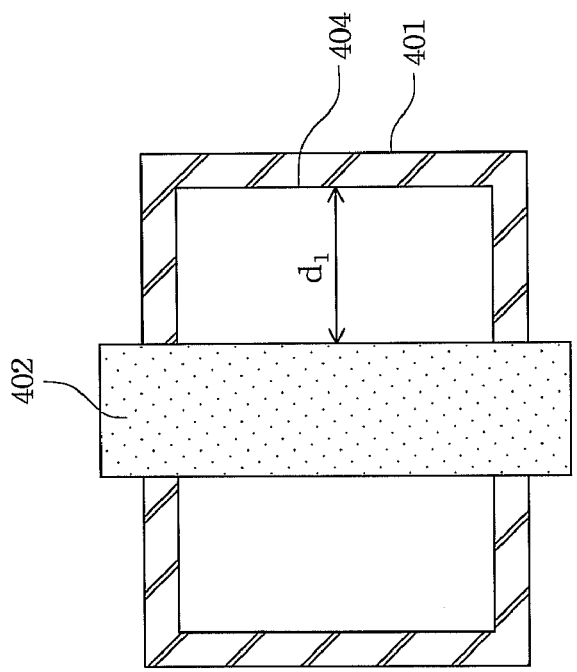
Fig. 3E
Fig. 3D

LIQUID CRYSTAL DISPLAY

RELATED APPLICATIONS

This application claims priority to Taiwan Application Serial Number 96144122, filed Nov. 21, 2007, which is herein incorporated by reference.

BACKGROUND

1. Field of the Invention

The present invention relates to a pixel structure, and more particularly to a pixel unit with improved viewing angles of a liquid crystal display.

2. Background of the Invention

Liquid crystal displays have been widely applied in electrical products, such as computer monitors and TV monitors, for a long time. To provide a wider viewing range, Fujitsu commercialized a multi-domain vertically aligned liquid crystal display (MVA-LCD) in 1997. MVA has almost perfect viewing angle characteristics. However, a notable weak point is that the skin color of Asian people (light orange or pink) appears whitish from an oblique viewing direction.

The solid line in FIG. 1 shows the transmittance-voltage (T-V) characteristics of the MVA in the normal direction. The vertical axis is the transmittance rate. The horizontal axis is the applied voltage. When the applied voltage increases, the transmittance rate curve 101 in the normal direction also increases. The transmittance changes monotonically as the applied voltage increases. However, in the oblique direction, the transmittance rate curve 102 winds and the various gray scales become the same. Especially in the region 100, the transmittance changes decrease as the applied voltage increases. This is the main reason that the skin color of Asian people appears whitish from an oblique viewing direction.

A method is provided to improve this foregoing problem. This method combines two different T-V characteristics. The dashed line 201 in FIG. 2 shows the original T-V characteristics in the oblique viewing direction. The dashed line 202 in FIG. 2 shows other T-V characteristics with a higher threshold voltage. By optimizing the threshold voltage and the maximum transmittance of these two lines, monotonic characteristics can be achieved, as shown by the solid line 203 in FIG. 2. According to the typical method, each pixel is divided into two areas. One area has the original threshold voltage and the other area has a higher one.

There is a residual image problem in the typical method. According to the typical method, each pixel unit includes a plurality of sub-pixels. Each sub-pixel may generate different voltage changes after the voltage applied to the pixel unit is removed. The different voltage change may generate different data voltage in two adjacent frames when corresponding to a common electrode, which may affect the image quantity. Therefore, it is also an objective to improve the image quality.

SUMMARY OF THE INVENTION

The present invention provides a liquid crystal display comprising a transistor disposed on a substrate and a capacitor coupling with the transistor. The capacitor is formed with a first conductive layer, an insulation layer, a semiconductor layer with a area $A_{sem}$ and a second conductive layer stacked on the substrate. The second conductive layer has a first region with a area $A_{con}$ overlapping with the semiconductor layer. The area $A_{con}$ is less than the area $A_{sem}$.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3D illustrates a top view of a metal-insulator-semiconductor (MIS) capacitor in accordance with a preferred embodiment of the present invention;

FIG. 3E illustrates another top view of a metal-insulator-semiconductor (MIS) capacitor in accordance with a preferred embodiment of the present invention.

DETAILED DESCRIPTION OF THE PREFERRED EMBODIMENT

Without limiting the spirit and scope of the present invention, the pixel unit structure proposed in the present invention is illustrated with a plurality of embodiments. One with ordinary skill in the art, upon acknowledging the embodiments, can apply the pixel unit structure of the present invention to various liquid crystal displays.

Figure 1:
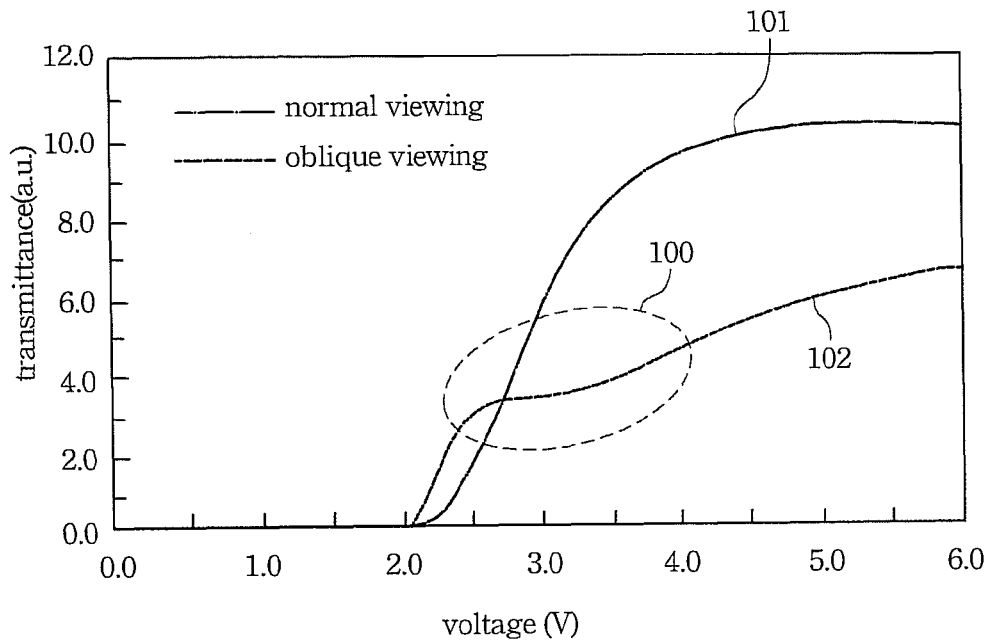
FIG. 1 illustrates a transmittance-voltage (T-V) characteristic of the MVA in the normal and oblique directions.
Figure 2:
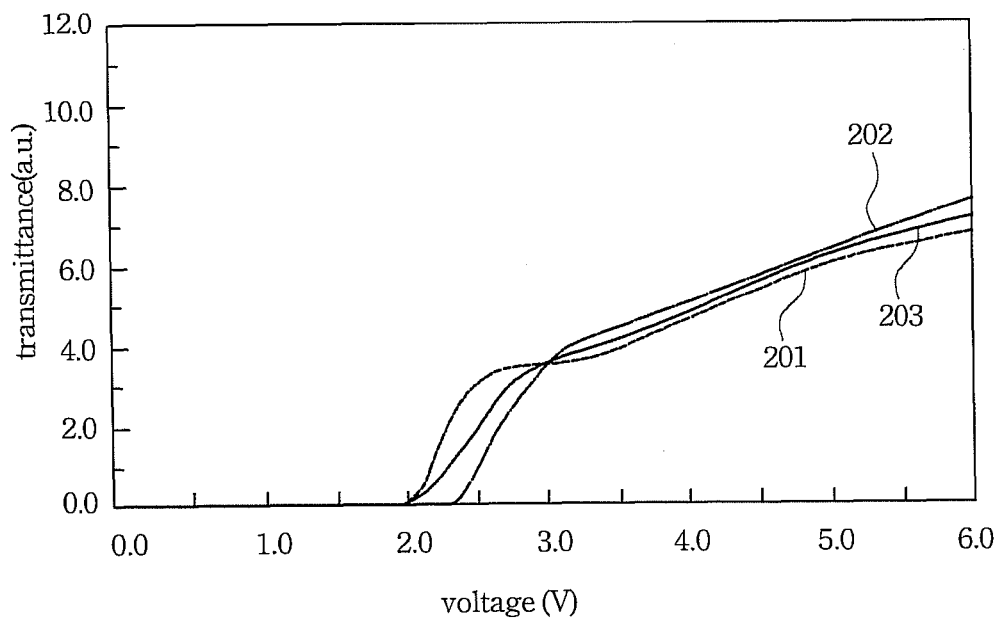
FIG. 2 illustrates the combination T-V characteristics in the oblique direction.
Figure 3A:
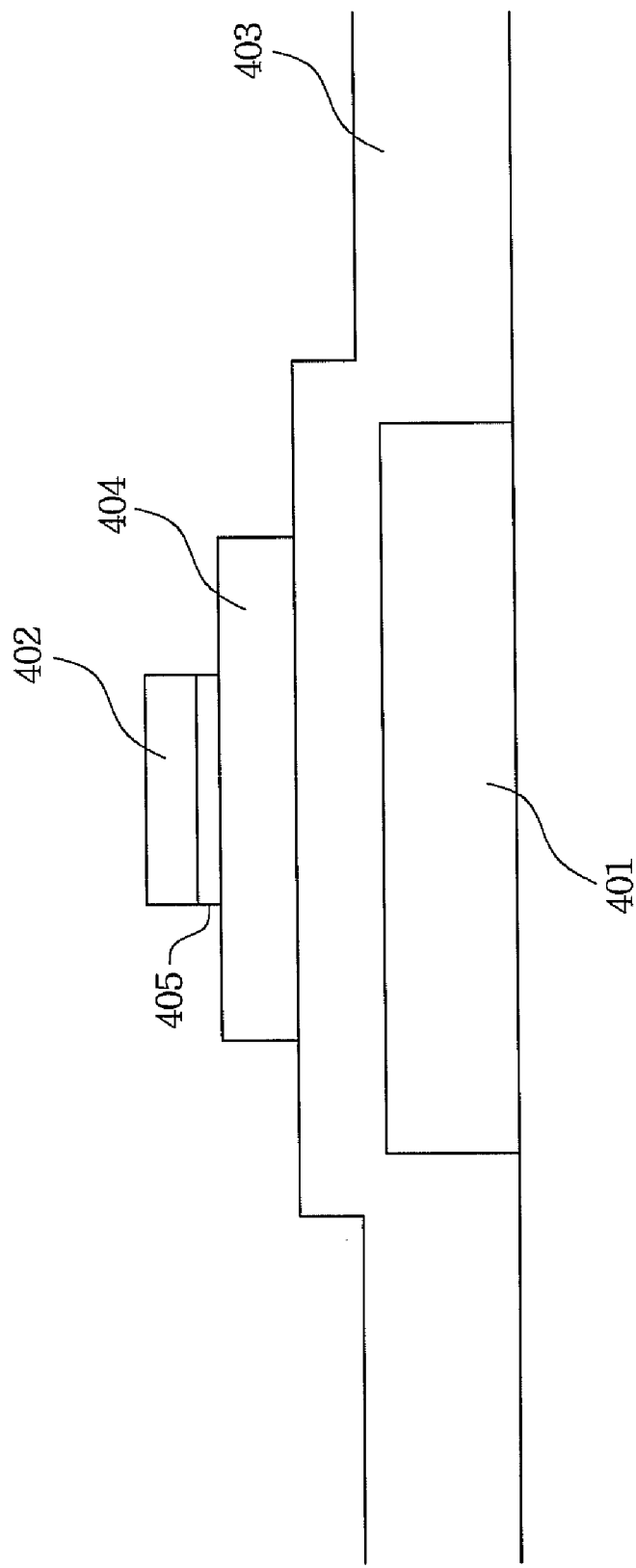
FIG. 3A illustrates a cross-sectional view of a metal-insulator-semiconductor (MIS) capacitor in accordance with a preferred embodiment of the present invention.

FIG. 3A illustrates a cross-sectional view of a metal-insulator-semiconductor (MIS) capacitor in accordance with a preferred embodiment of the present invention. An insulation layer 403, a semiconductor layer 404 and a heavy-doped semiconductor layer 405 are located between the first conductive layer 401 and the second conductive layer 402. The metal-insulator-semiconductor (MIS) structure forms a capacitor. The semiconductor layer 404 is an amorphous silicon layer. The heavy-doped semiconductor layer 405 is an N-type amorphous silicon layer. The capacitance of an MIS capacitor is changeable and related to the value of the voltage difference ($V_{M1}-V_{M2}$) between the first conductive layer 401 and the second conductive layer 402. Therefore, the MIS capacitor is also called a voltage-controlled capacitor.

Moreover, the area of the first conductive layer 401 is larger than that of the semiconductor layer 404. The area of the second conductive layer 402 is equal to the area of the heavy-doped semiconductor layer 405. The areas of the first conductive layer 401, the second conductive layer 402, the insulation layer 403 and the semiconductor layer 404 are different from each other. Therefore, the capacitance range of the MIS capacitor is enlarged to improve the color shift problem. On the other hand, a person skilled in the art can adjust the area relationship between the first conductive layer 401 and the semiconductor layer 404 based on fabrication requirement.

For example, the area of the first conductive layer 401 is adjusted to less than the area of the semiconductor layer 404.

Figure 3C:
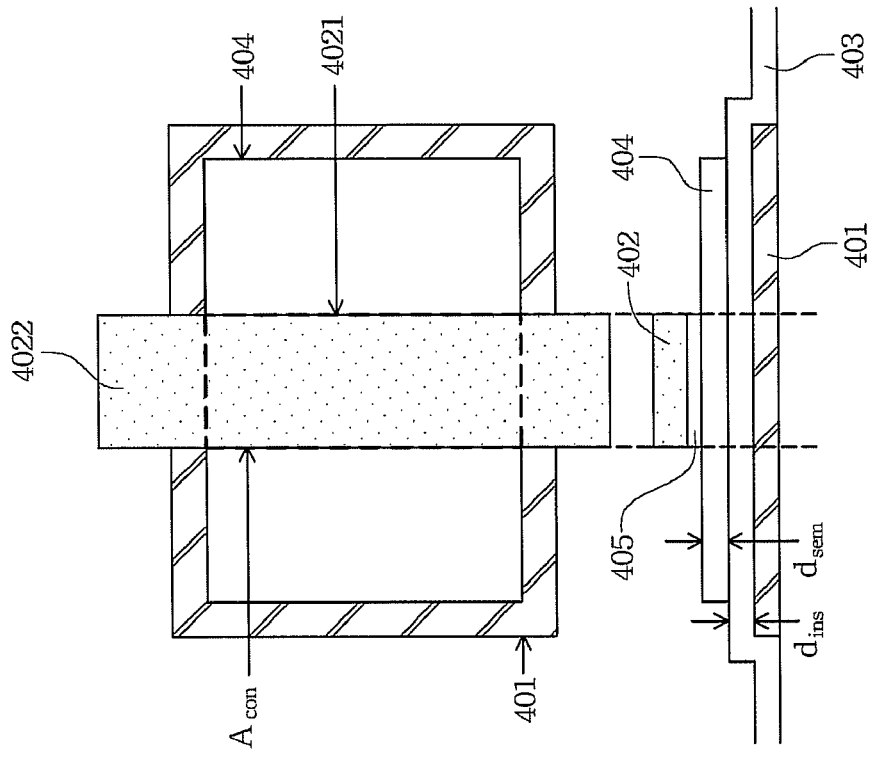
FIG. 3C illustrates another relationship of a cross-sectional view and a top view of a metal-insulator-semiconductor (MIS) capacitor in accordance with a preferred embodiment of the present invention.
Figure 3B:
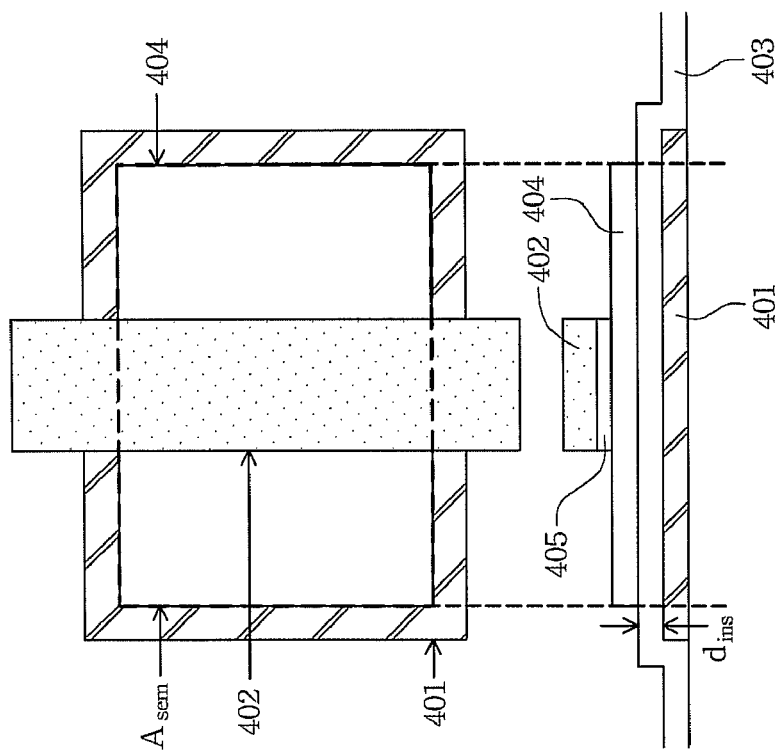
FIG. 3B illustrates a relationship of a cross-sectional view and a top view of a metal-insulator-semiconductor (MIS) capacitor in accordance with a preferred embodiment of the present invention.

FIG. 3B illustrates a relationship of a cross-sectional view and a top view of a metal-insulator-semiconductor (MIS) capacitor. When the voltage ($V_{M1}$) applied to the first conductive layer 401 is larger than the voltage ($V_{M2}$) applied to the second conductive layer 402 plus a threshold voltage ($V_{th}$), the conductive state between the second conductive layer 402 and the semiconductor layer 404 is improved, so that the semiconductor layer 404 serves as an electrode of the MIS capacitor. Therefore, the distance between the two electrodes of the MIS capacitor is the thickness $d_{ins}$ of the insulation layer between the first conductive layer 401 and the semiconductor layer 404. The area $A_{sem}$ of the semiconductor layer 404 determines the area of the MIS capacitor. The capacitance of the MIS capacitor $C_{on}$ is as follows:

$$C_{on} = \varepsilon_{ins} \frac{A_{sem}}{d_{ins}}$$

The $\varepsilon_{ins}$ is the dielectric constant of the insulation layer 403.

FIG. 3C illustrates another relationship of a cross-sectional view and a top view of a metal-insulator-semiconductor (MIS) capacitor. The second conductive layer 402 has a first region 4021 and a second region 4022. The first region 4021 overlaps the semiconductor layer 404. The second region 4022 does not overlap the semiconductor layer 404. When the voltage ($V_{M1}$) applied to the first conductive layer 401 is less than the voltage ($V_{M2}$) applied to the second conductive layer 402 plus a threshold voltage ($V_{th}$), the conductive state between the second conductive layer 402 and the semiconductor layer 404 is weakened, so that the semiconductor layer 404 does not serve as an electrode of the MIS capacitor. Therefore, the two electrodes of the MIS capacitor are the second conductive layer 402 and the heavy-doped semiconductor layer 405 respectively. The distance between the two electrodes is the distance between the first conductive layer 401 and the heavy-doped semiconductor layer 405. That is the thickness $d_{ins}$ of the insulation layer 403 and the thickness $d_{sem}$ of the semiconductor layer 404. The area $A_{con}$ of the first region 4021 determines the area of the MIS capacitor. The capacitance of the MIS capacitor $C_{off}$ is as follows:

$$C_{off} = \frac{A_{con}}{\frac{d_{ins}}{\varepsilon_{ins}} + \frac{d_{sem}}{\varepsilon_{sem}}}$$

The $\varepsilon_{sem}$ is the dielectric constant of the semiconductor layer 404. The area $A_{sem}$ is larger than the area $A_{con}$.

In other words, the capacitance of the MIS capacitor is decided based on the relationship between the voltages applied to the first conductive layer 401 and the second conductive layer 402 and the threshold voltage ($V_{th}$). Moreover, different relationship between the voltages applied to the first conductive layer 401 and the second conductive layer 402 causes different area and distance of the MIS capacitor. Therefore, changing the relationship between the voltages applied to the first conductive layer 401 and the second conductive layer 402 and the threshold voltage ($V_{th}$) can define a different capacitance. In this embodiment, the range of the capacitance C is as follows.

$$C_{off} \leq C \leq C_{on} \quad \frac{A_{con}}{\frac{d_{ins}}{\varepsilon_{ins}} + \frac{d_{sem}}{\varepsilon_{sem}}} \leq C \leq \varepsilon_{ins} \frac{A_{sem}}{d_{ins}}$$

FIG. 3D illustrates a top view of a metal-insulator-semiconductor (MIS) capacitor in accordance with a preferred embodiment of the present invention. The capacitor includes a first conductive layer 401, a second conductive layer 402 and a semiconductor layer 404. The second conductive layer 402 is located over the semiconductor layer 404. The second conductive layer 402 has a first side. The semiconductor layer 404 has a second side next to the first side, wherein a distance d1 separates the first side and the second side. When the semiconductor layer 404 is an amorphous silicon layer, the requirement for the $d_1$ is $d_1 \leq 10$ μm. However, when the semiconductor layer 404 is a single crystal silicon layer or a poly silicon layer, the distance of the $d_1$ can also be larger than 10 μm.

According to another embodiment, the first part 402a and the second part 402b that are connected together as illustrated in the FIG. 3E forms the second conductive layer 402. The total area of the first part 402a and the second part 402b overlapping the semiconductor layer 404 is less than the area of the semiconductor layer 404. The first part 403a is electrically connected to the second part 402b. On the other hand, the first part 403a and the second part 403b are located in the two sides over the semiconductor layer 404 respectively. That is a second distance $d_2$, where $d_2 \leq 20$ μm, separates the first part 403a from the second part 402b. According to this structure, the reversed speed of the semiconductor layer 404 is enhanced since the first part 403a and the second part 403b work together in this embodiment. That means the switch speed between "on" state and "off" state of the semiconductor is enhanced.

Figure 4:
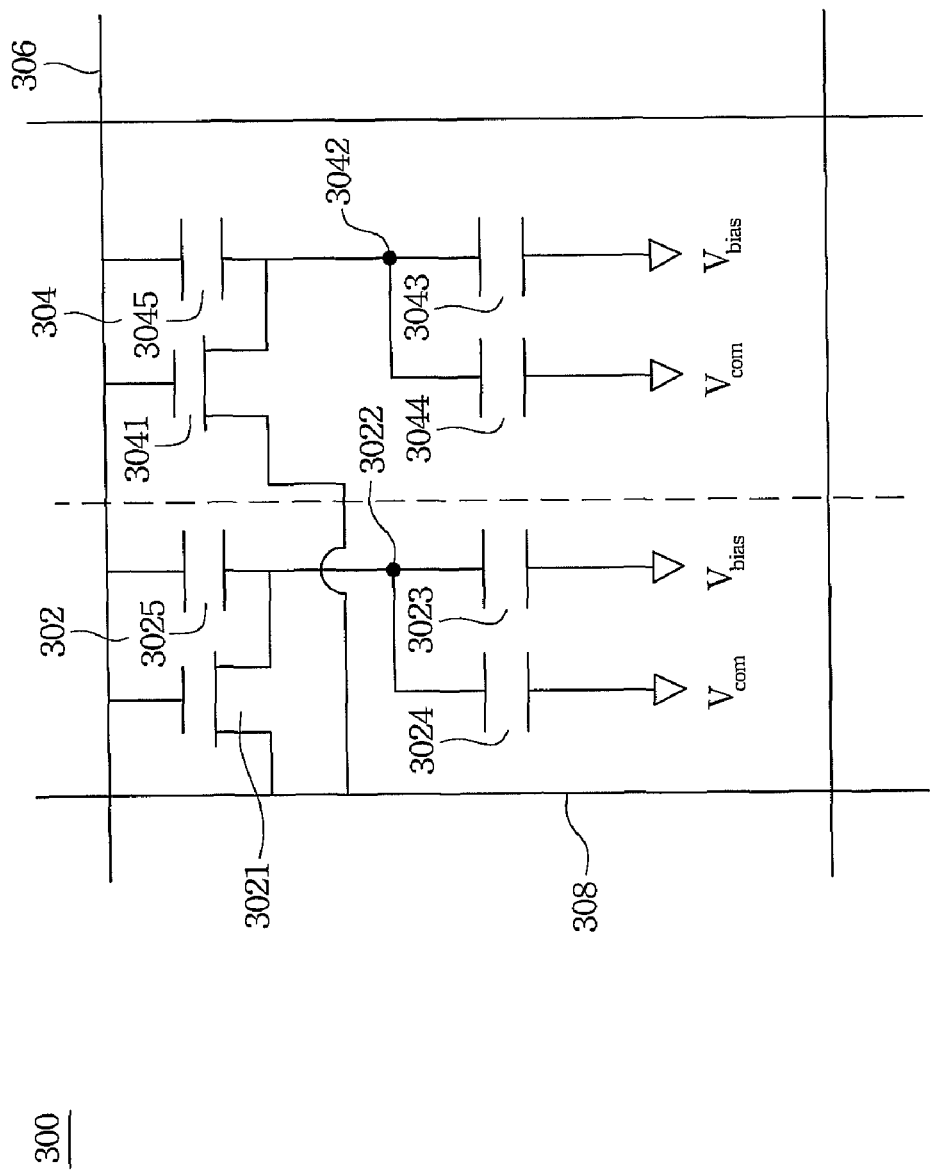
FIG. 4 illustrates a schematic diagram of a pixel unit according to the preferred embodiment of the present invention.

FIG. 4 illustrates a schematic diagram of a pixel unit according to the preferred embodiment of the present invention. The pixel unit 300 includes two sub pixels 302 and 304.

The sub-pixel 302 includes a thin film transistor 3021. According to the thin film transistor 3021, the gate electrode is connected to the scanning line 306, the drain electrode is connected to the data line 308 and the source electrode is connected to the pixel electrode 3022. The storage capacitor 3023 is connected to the pixel electrode 3022 and the bias electrode $V_{bias}$. The liquid crystal capacitor 3024 is connected to the pixel electrode 3022 and the common electrode $V_{com}$. A diffusion capacitor 3025 exists between the gate and the source electrode of the thin film transistor 3021.

The sub-pixel 304 includes a thin film transistor 3041. According to the thin film transistor 3041, the gate electrode is connected to the scanning line 306, the drain electrode is connected to the data line 308 and the source electrode is connected to the pixel electrode 3042. The storage capacitor 3043 is connected to the pixel electrode 3042 and the bias electrode $V_{bias}$. The liquid crystal capacitor 3044 is connected to the pixel electrode 3042 and the common electrode $V_{com}$. A diffusion capacitor 3045 exists between the gate and the source electrode of the thin film transistor 3041.

In this embodiment, the storage capacitor 3023 is a metal-insulator-semiconductor-metal structure, MIS structure. The storage capacitor 3043 is a metal-insulator-metal structure. However, in other embodiments, the MIS structure can form the storage capacitor 3043.

On the other hand, according to the FIG. 4, both the MIS structure illustrated in the FIG. 3D and FIG. 3E can form the storage capacitor 3023. The following description is about the FIG. 4 and FIG. 3D. The rest may be deduced by analogy. The first conductive layer 401 of the storage capacitor 3023 is coupled to the source electrode of the thin film transistor 3021 through a through hole. The second conductive layer 402 of the storage capacitor 3023 is coupled to the bias voltage through another through hole. However, a person skilled in the art may know that the first conductive layer 401 of the storage capacitor 3023 can also couple to the bias voltage and the second conductive layer 402 of the storage capacitor 3023 can also couple to the source electrode of the thin film transistor 3021 in other embodiments.

Moreover, making the pixel electrodes 3022 and 3042 have different areas in the FIG. 4 according to the present invention can improve the color shift phenomenon.

Accordingly, each pixel unit includes two sub-pixels. Each sub-pixel includes a storage capacitor, a liquid crystal capacitor and a thin film transistor. One of the storage capacitors is a changeable capacitor or voltage control capacitor. By changing the capacitor structure of the changeable capacitor to enlarge its capacitance difference, the display quality of the display is improved.

While the preferred embodiment of the invention has been illustrated and described, it will be appreciated that various changes can be made therein without departing from the spirit and scope of the invention.

What is claimed is:

1. A liquid crystal display, comprising:
a transistor disposed on a substrate; and
a capacitor coupling with the transistor, wherein the capacitor is formed with a first conductive layer disposed on the substrate, an insulation layer disposed on the first conductive layer, a semiconductor layer disposed on the insulation layer with a area $A_{sem}$ and a second conductive layer disposed over the semiconductor;
wherein the second conductive layer has a first region with a area $A_{con}$ overlapping with the semiconductor layer, and the area $A_{con}$ is less than the area $A_{sem}$;
wherein the dielectric constant of the insulation layer is $\epsilon_{ins}$, the thickness of the insulation layer is $d_{ins}$, the dielectric constant of the semiconductor layer is $\epsilon_{sem}$ and the thickness of the semiconductor layer is $d_{sem}$;
wherein, the capacitance of the capacitor is C, and the capacitance C is defined as follows:

$$\frac{A_{con}}{\frac{d_{ins}}{\varepsilon_{ins}} + \frac{d_{sem}}{\varepsilon_{sem}}} \leq C \leq \varepsilon_{ins} \frac{A_{sem}}{d_{ins}}.$$

2. The liquid crystal display as claimed in claim 1, wherein the second conductive layer has a second region, and the second region does not overlap the semiconductor layer.

3. The liquid crystal display as claimed in claim 1, wherein the area of the first conductive layer is larger than that of the semiconductor layer.

4. The liquid crystal display as claimed in claim 1, further comprising a heavy doped semiconductor layer disposed on the location between the second conductive layer and the semiconductor layer.

5. The liquid crystal display as claimed in claim 4, wherein the area of the second conductive is about equal to the area of the heavy doped semiconductor layer.

6. The liquid crystal display as clamed in claim 1, wherein the semiconductor layer is amorphous silicon layer.

7. The liquid crystal display as claimed in claim 6, wherein the second conductive layer has a first side and the semiconductor layer has a second side next to the first side.

8. The liquid crystal display as claimed in claim 6, wherein the first side and the second side are separated by a first distance $d_1$, and $d_1 \square 10$ μm.

9. The liquid crystal display as claimed in claim 6, wherein the second conductive layer has a first part and a second part.

10. The liquid crystal display as claimed in claim 9, wherein the first part is electrically connected to the second part.

11. The liquid crystal display as claimed in claim 9, wherein the first part and the second part are separated by a second distance $d_2$, and $d_2 \square 20$ μm.

* * * * *